United States Patent

Farelli

[11] 4,027,910
[45] June 7, 1977

[54] TERMINAL FOR THE FUEL FILLING PIPE OF A MOTOR VEHICLE

[76] Inventor: Mario Farelli, C. so Giulio Cesare 298, Turin, Italy

[22] Filed: Oct. 15, 1975

[21] Appl. No.: 622,563

[30] Foreign Application Priority Data

Oct. 18, 1974 Italy .................. 70109/74

[52] U.S. Cl. .................. 296/1 C; 220/86 R; 280/5 A; 285/39; 285/204
[51] Int. Cl.² .................. B60P 3/22; B65D 39/00
[58] Field of Search .................. 220/86 R, 378, 18; 285/201, 202, 204, 39; 277/4, 9; 403/19, 254, 288, 221; 70/168, 169, 172, 173; 280/5 A; 296/1 C

[56] References Cited

UNITED STATES PATENTS

| | | | |
|---|---|---|---|
| 1,207,478 | 12/1916 | Birkigt | 285/201 |
| 1,513,516 | 10/1924 | Mc Cabe et al. | 285/204 |
| 1,716,724 | 6/1929 | Greer | 220/210 |
| 1,774,439 | 8/1930 | Holtson | 70/168 |
| 2,031,350 | 2/1936 | Evans | 285/204 |
| 2,242,671 | 5/1941 | Godber | 220/86 R |
| 2,343,440 | 3/1944 | Andras | 285/204 |
| 2,450,173 | 9/1948 | Uhrl | 285/204 |
| 2,466,075 | 4/1949 | Bentley et al. | 280/5 A |
| 2,471,716 | 5/1949 | Bell | 285/204 |
| 2,708,594 | 5/1955 | MacPherson | 296/1 C |
| 2,765,179 | 10/1956 | Clark et al. | 280/5 A |
| 2,858,150 | 10/1958 | Neher et al. | 403/221 |
| 3,159,409 | 12/1964 | Koehler | 296/1 C |
| 3,208,775 | 9/1965 | Stap et al. | 220/378 |
| 3,856,316 | 12/1974 | Badberg | 280/5 A |

*Primary Examiner*—William Price
*Assistant Examiner*—Allan N. Shoap
*Attorney, Agent, or Firm*—Alan H. Levine

[57] ABSTRACT

A filler pipe terminal accommodated in its entirety within a recessed annular seat in a motor vehicle body. The terminal includes an outwardly projecting end flange, and a second outwardly projecting flange spaced downstream of the end flange. A resilient gasket is arranged between the end flange and the recessed seat bottom, the gasket also being between the seat bottom and the portion of the filler pipe passing through the seat bottom. A resilient retaining element is arranged between the seat bottom and the second flange. The terminal is provided with an inwardly projecting flange for cooperation with a locking closure cap, the latter being entirely accommodated within the end of the terminal.

8 Claims, 4 Drawing Figures

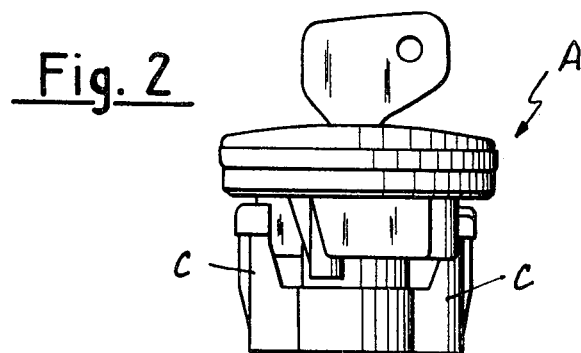
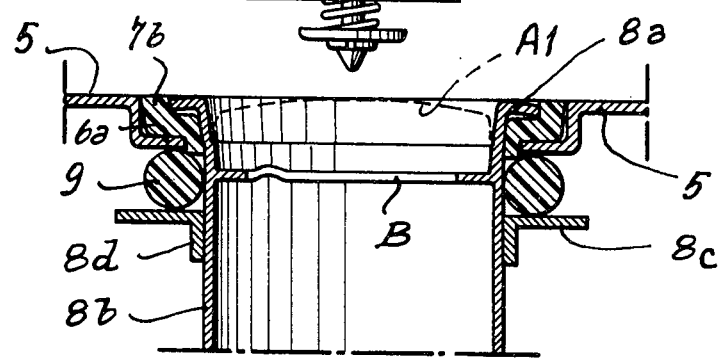
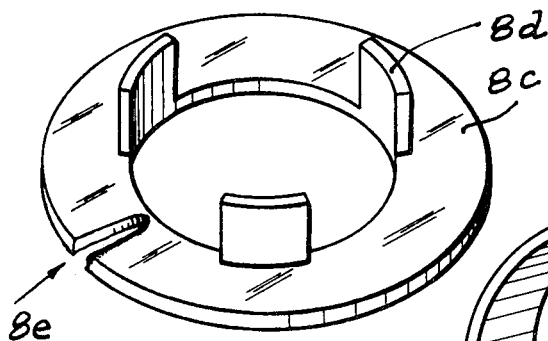
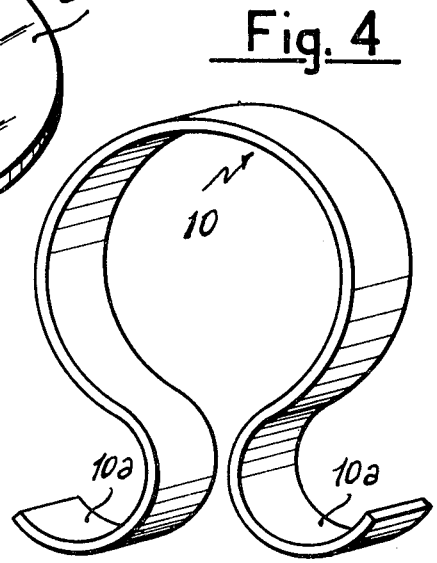

TERMINAL FOR THE FUEL FILLING PIPE OF A MOTOR VEHICLE

It is known that in motor vehicles in general, the end of the filler pipe leading to the fuel tank is generally closed by a threaded cap, or a cap with a bayonet connection, sometimes controlled by a key. The end of the filler pipe and the cooperating cap, for obvious maneuverability reasons, are mounted in a protruding position on one of the vehicle body sides or in a special recess formed in the vehicle body.

This known arrangement involves certain complex work to secure the tubular branch pipe which, generally, requires supporting brackets which are not welded in the proximity of the filler pipe in order to avoid visible welding points on the exposed surface of the vehicle body.

It may be stated in advance that the Applicant is the owner of copending U.S. Pat. application Ser. No. 548,709, filed Feb. 10, 1975, whose subject matter is a safety cap for filler pipes of motor vehicle fuel tanks characterized, among other things, in that it is completely located in the filler pipe terminal, which is cup-shaped. The subject matter of present invention is a filler pipe terminal generally characterized in that it is mounted with its edges lying in the same plane as the vehicle body surface, and specifically characterized by the means used for rapidly assembling the terminal in its seat in the vehicle body, said means requiring no welding, riveting, or other equivalent operation.

More specifically, the filler pipe terminal is characterized by its cup shape provided with a perimetrical flange under which there is inserted an annular resilient packing which is grasped between the flange and the depressed edge of the filler seat formed in the vehicle body. Immediately downstream of the filler seat in the body, the outer surface of the filler pipe is provided with a second perimetrical flange which defines, between the vehicle body and the second flange, an annular seat or throat for accommodating a suitable retaining member by means of which the filler terminal can rapidly be mounted in the filler seat in the vehicle body.

From the brief description above, it is clear that an object of the invention is to provide a filler pipe terminal for fuel tanks of motor vehicles in general, which may be rapidly mounted and/or diassembled with respect to its seat in the vehicle body, and which filler terminal is capable of receiving and containing, without protruding beyond to the vehicle body surface, a safety cap of the type which is the subject matter of the above mentioned copending U.S. patent application.

Broader and more particular features of the filler terminal and the assembling means according to the invention will be seen from the following detailed description in which reference is made to the annexed drawings showing illustrative examples of the invention. In the drawings:

FIG. 2 shows a side view of a cap, and a longitudinal cross-sectional view of the filler terminal according to the invention;

FIG. 3 is a perspective view of a flange comprising part of the assembly shown in FIG. 2; and FIG. 4 is a perspective view of a resilient ring which may be used in the assembly of FIG. 2.

Figure 1:
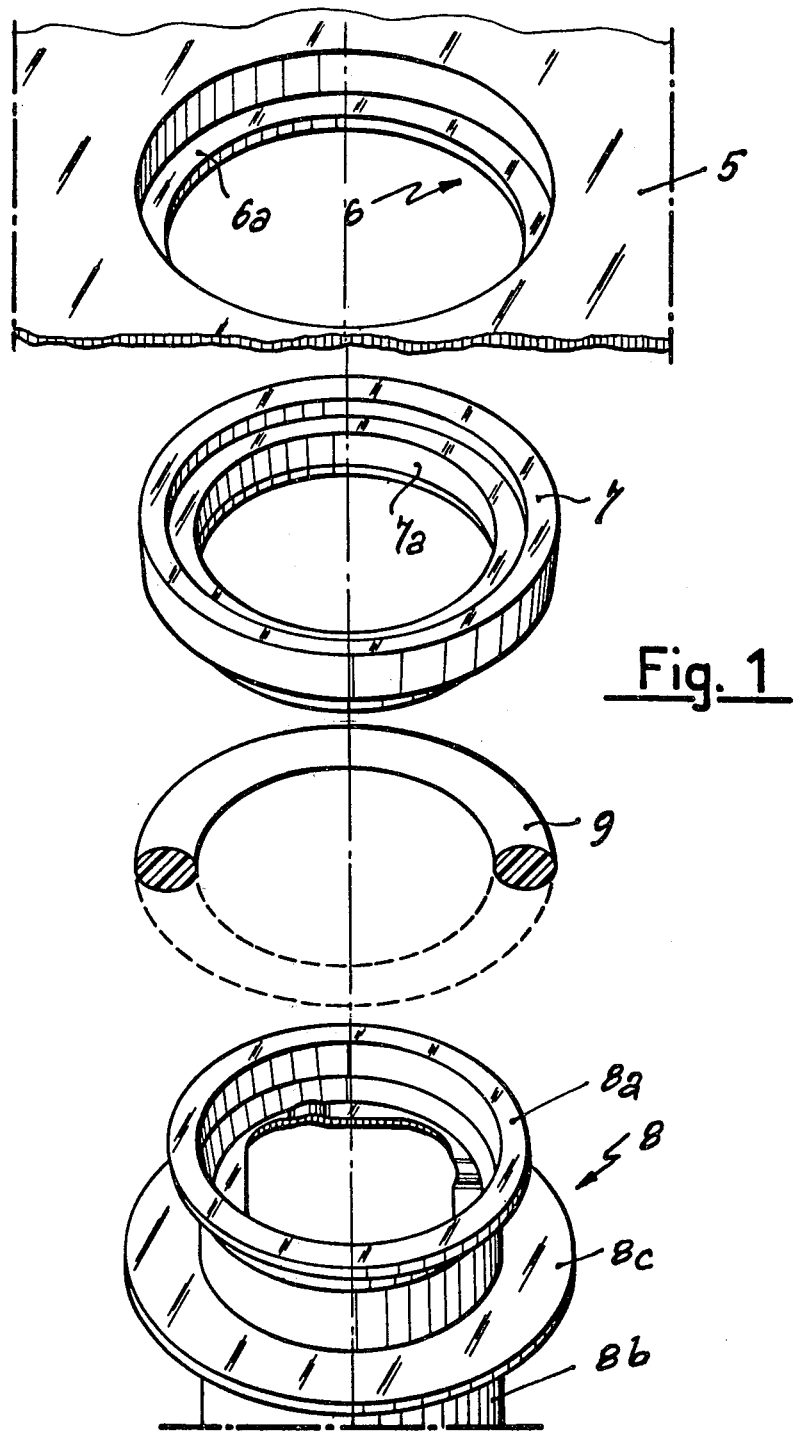
FIG. 1 is an exploded perspective view, showing the members used for assembling the filler terminal aligned along a vertical axis.

With particular reference to FIG. 1, numeral 5 indicates a section of the motor vehicle body. In the position where the filler terminal, for the filling of the fuel tank, joins the vehicle body, the latter is formed with a circular hollow seat 6 having a recessed bottom 6a intended to receive the elastic annular gasket 7, whose cross section is indicated at 7b in FIG. 2.

While the lower annular part 7a gasket 7, which forms a short neck, adheres around its circumference to the perimeter of hollow seat 6, the upper protruding edge 7b of gasket 7 fits within the recessed perimeter of the seat. The filler terminal 8 has a flange 8a integral with the filler pipe 8b (as shown in FIGS. 1 and 2), or the flange may be a separate piece permanently mounted on pipe 8b. The terminal also includes a second annular flange 8c, illustrated in detail in FIG. 3, and formed by a metal ring. The ring is provided with three fins 8d, or if desired a continuous collar, by means of which flange 8c is connected to the filler pipe 8d, at a suitable distance from flange 8a, e.g., by means of spot welding.

To assemble the filler terminal in the seat 6, the filler terminal is protrudingly located beyond the seat, toward the outside of body 5. Under the filler flange 8a the gasket 7 is mounted. Due to its profile, the gasket rests on the annular bottom 6a and its lower part 7a projects through the opening defined by the edge of bottom 6a. In such condition (FIG. 2), only the gasket 7 is in contact with the edges of seat 6, to which it adheres, and with the flange 8a and the filler pipe section passing through the seat 6, and therefore, the gasket forms a resilient intermediate member between seat 6 and flange 8a and the filler pipe.

Downstream of the body 5 and upstream of flange 8c, there is mounted by elastic deformation a strong ring 9 made of rubber or other suitable material. The diameter of the ring 9 cross section is such that it is contained with a slight resilient deformation within the space between the opposed surfaces of flange 8c and bottom 6a, while its inner diameter is such as to tightly grip the filler pipe 8b.

The filler terminal, mounted as in FIG. 2, is elastically supported, both longitudinally and transversely, without any contact with the vehicle body.

If it becomes necessary to disassemble the filler terminal, and remove it from the body, it is first necessary to remove the ring 9. In order to make this maneuver easy, the edge of the downstream retaining flange 8c is provided with a slot 8e, shaped in any manner which is suitable to allow the use of a tool, e.g., having a hooked end, which may engage any point on the inside of the ring and pull it, by a resilient deformation, beyond the outer edge of flange 8c.

Alternatively, any other equivalent retaining element may obviously be used instead of ring 9 as, e.g., the resilient open ring 10 shown in FIG. 4, having bent ends 10a, which allows it to be resiliently deformed easily, and mounted downstream of the bottom 6a to lock the filter terminal in its seat 6.

The assembled filler terminal arranged in its seat is closed by a cap A (FIG. 2), provided with a safety lock. Cap A is completely embedded in the filler terminal, as indicated by dashed line A 1, which represents the upper convex surface of cap A when it is arranged in the closing position. B is a retaining radial flange for the latch C of cap A, which is the subject matter of the previously-mentioned patent application.

From the above description, the numerous advantages deriving from the use of the filler according to the present invention may be seen, including its rapid assembly with a motor vehicle. Also, the gasket 7 and ring 9 provide a resilient support suitable to dampen the vibrations produced by the movement of the motor vehicle.

Obviously, all the means equivalent to those shown and described for the sake of illustration, and the possible improvements or variants which may be dictated by practical use requirements, are comprised in the scope of the present invention.

What is claimed is:
1. An automobile fuel filler pipe assembly comprising:
   a. an automobile body portion having a recessed opening surrounded by an inwardly-projecting seat recessed beneath the outer surface of the body portion,
   b. a filler pipe having a terminal portion within said opening,
   c. a first outwardly projecting flange at the end of said pipe, said flange being spaced above said seat in the body portion,
   d. a resilient gasket having portions between:
      I. the outer edge of said first flange and said automobile body portion,
      II. said first flange and said seat, and
      III. the inner edge of said seat and said filler pipe, said gasket maintaining said pipe and body portion completely out of contact with each other,
   e. a second flange projecting outwardly from said pipe, said second flange being spaced beneath said seat, and
   f. resilient retaining means around the exterior of said pipe and fitted snugly between said seat and said second flange.

2. As assembly as defined in claim 1 wherein said resilient retaining means is an outwardly stretchable ring-like element.

3. An assembly as defined in claim 2 wherein said outwardly stretchable element is a continuous ring of resilient material.

4. An assembly as defined in claim 2 wherein said outwardly stretchable element is a discontinuous springy strip having a generally circular central portion and outwardly flared ends.

5. An assembly as defined in claim 2 wherein said second flange is formed with a notch extending inwardly from the outer edge of said second flange to provide access to said outwardly stretchable element by a tool, whereby said element can be stretched outwardly over said second flange to release the engagement between said filler pipe and said automobile body portion.

6. An assembly as defined in claim 1 wherein said resilient gasket has a stepped configuration including a vertically extending upper portion, a horizontally extending intermediate portion, and a vertically extending lower portion.

7. An assembly as defined in claim 1 wherein said first flange and gasket are entirely accommodated within the recess between said seat and the outer surface of said automobile body portion so that no portion of the assembly projects beyond said outer surface.

8. An assembly as defined in claim 7 including a closure cap for said filler pipe, said cap being entirely accommodated within said pipe so that said cap does not project beyond the outer surface of said automobile body portion.

* * * * *